Figure 1:
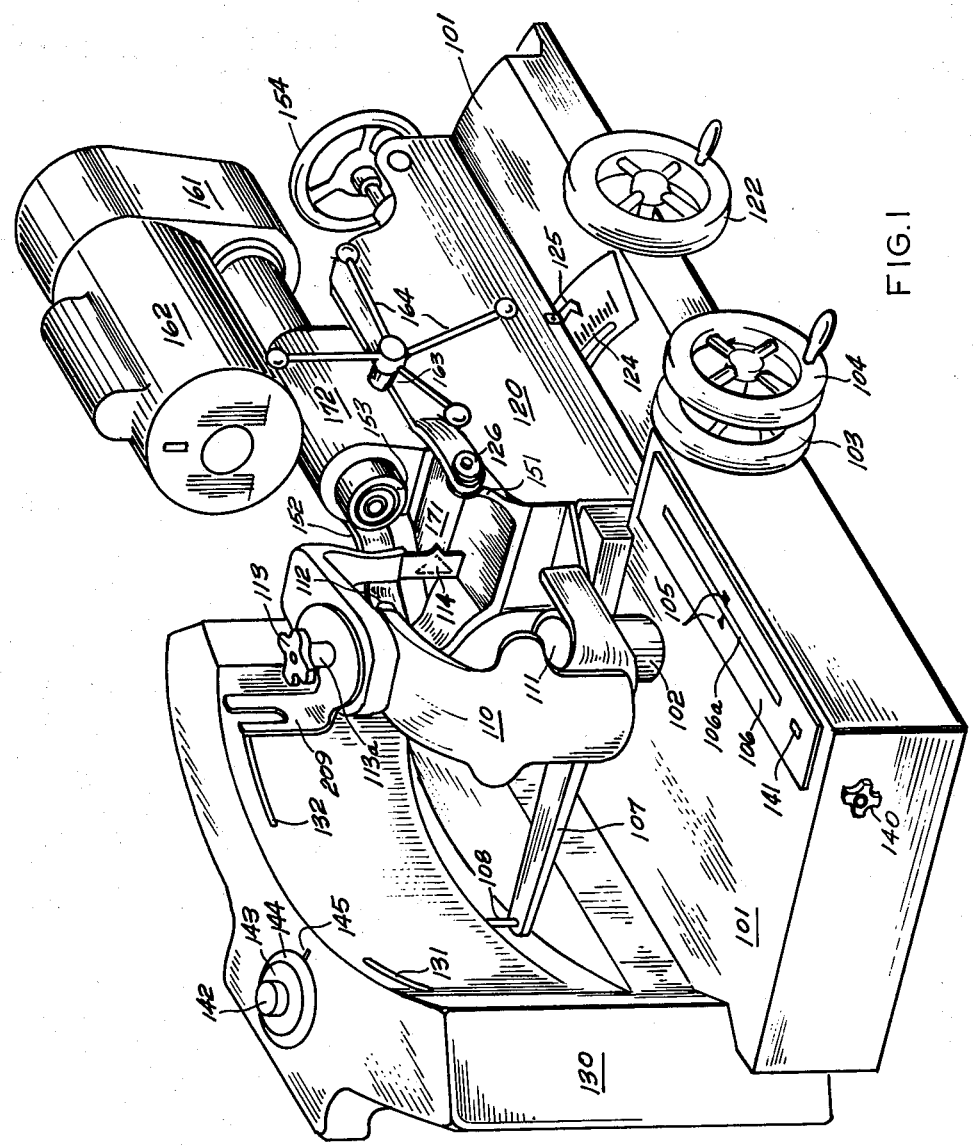

July 26, 1966  D. B. SCOTT  3,262,339
BALL DRILLING APPARATUS
Original Filed March 5, 1962  10 Sheets-Sheet 1

DAVID B. SCOTT
INVENTOR

BY *Richard L. Stephens*
ATTORNEY

DAVID B. SCOTT
INVENTOR

BY Richard G. Stephens
ATTORNEY

July 26, 1966 D. B. SCOTT 3,262,339
BALL DRILLING APPARATUS
Original Filed March 5, 1962 10 Sheets-Sheet 5
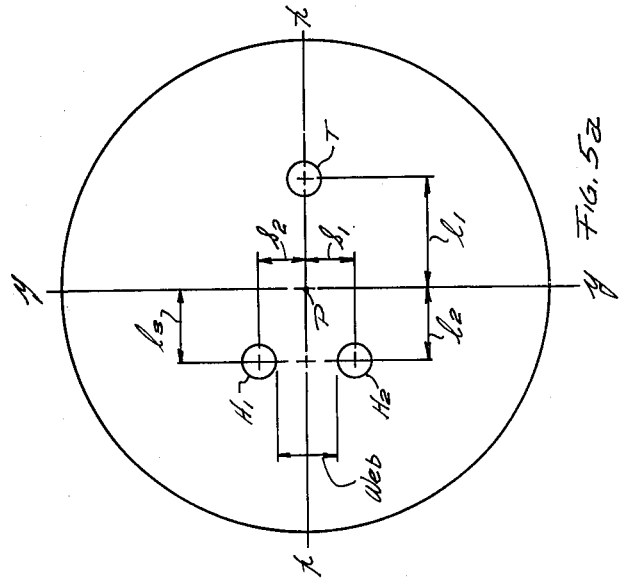
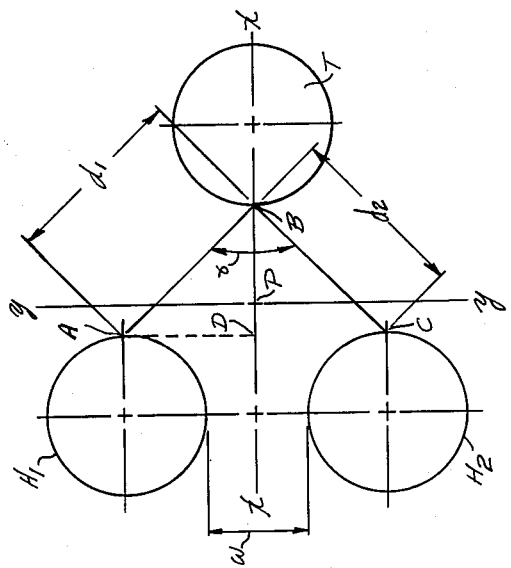
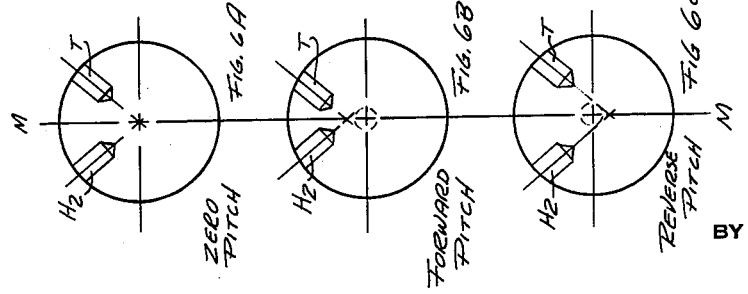
DAVID B. SCOTT
INVENTOR
BY Richard D. Stephens
ATTORNEY

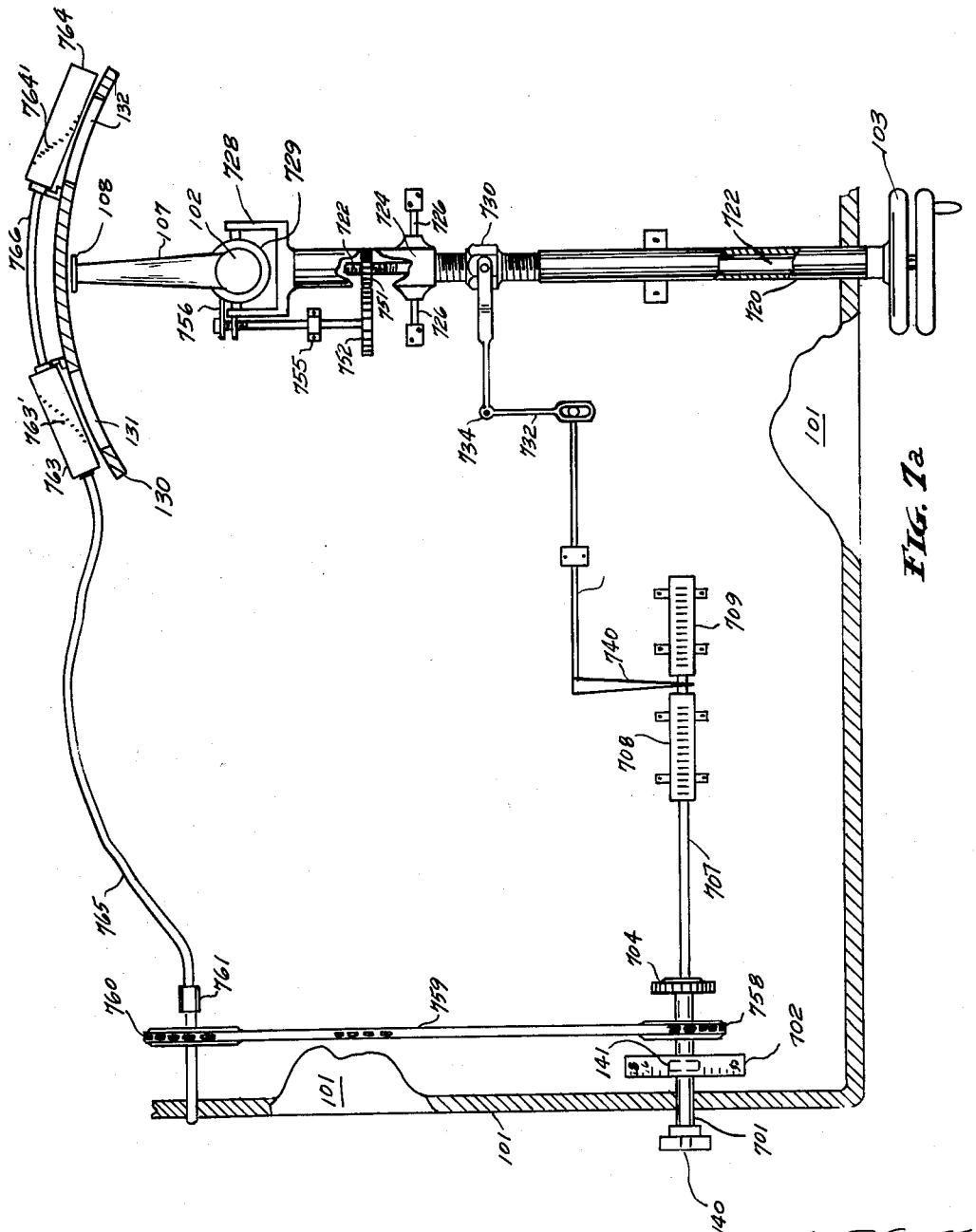

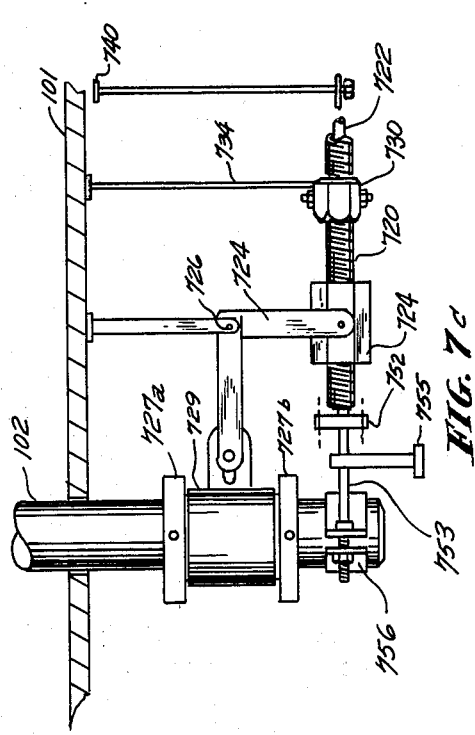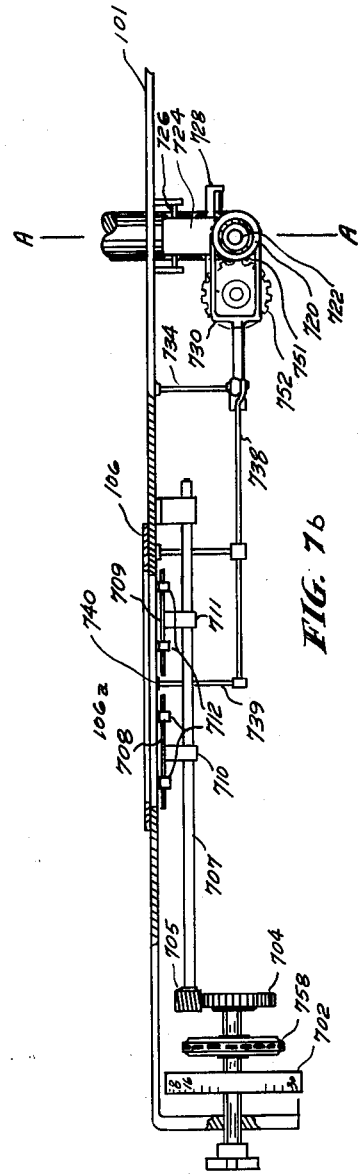

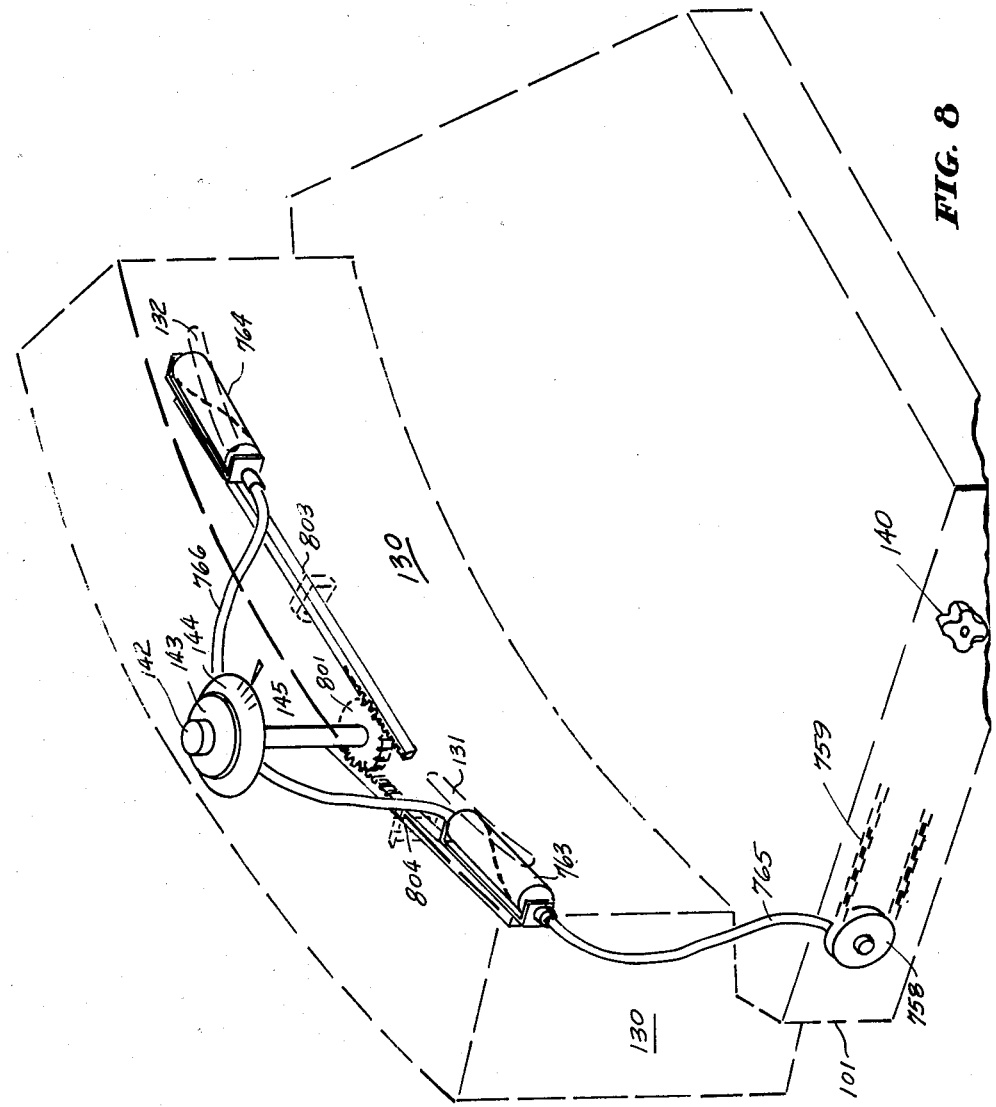

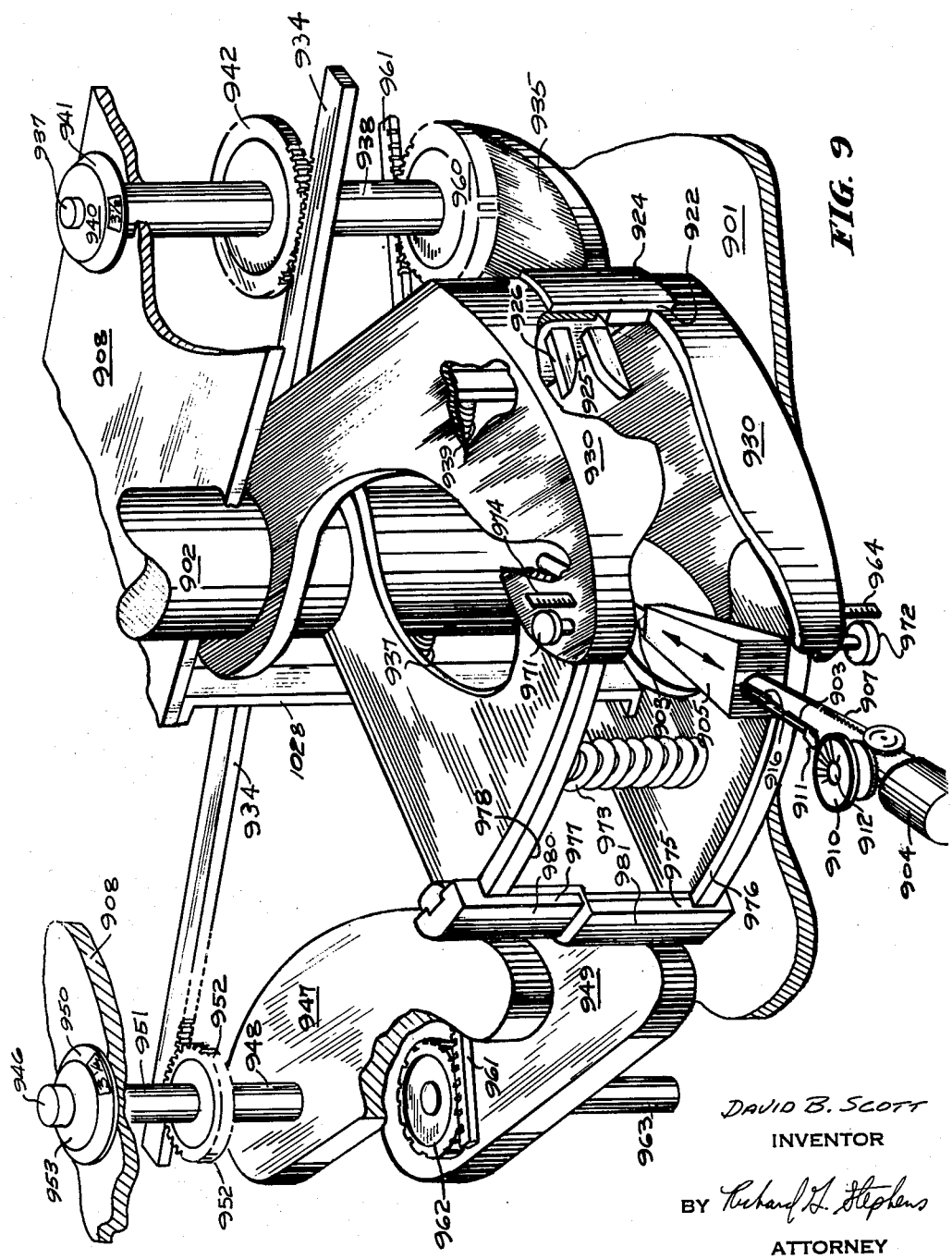

July 26, 1966 D. B. SCOTT 3,262,339
BALL DRILLING APPARATUS

Original Filed March 5, 1962 10 Sheets-Sheet 10

DAVID B. SCOTT
INVENTOR

BY *Richard H. Stephens*
ATTORNEY

United States Patent Office 3,262,339
Patented July 26, 1966

3,262,339
BALL DRILLING APPARATUS
David B. Scott, Walton, N.Y., assignor to Scott Machine Development Corporation, Walton, N.Y., a corporation of New York
Continuation of abandoned application Ser. No. 177,439, Mar. 5, 1962. This application Feb. 3, 1964, Ser. No. 342,861
34 Claims. (Cl. 77—31)

This application is a continuation of my prior application Serial No. 177,439 filed March 5, 1962 and now abandoned.

This invention relates to method and apparatus for drilling spherical objects, such as the boring of finger holes in conventional bowling balls, and more particularly to an improved apparatus for spacing and drilling holes which is so simple to operate that custom drilling can be readily accomplished by quite unskilled persons. Most bowling balls are drilled to a particular bowler's physical requirements, and usually drilled by a local bowling establishment proprietor to his customer's specific order. Since these proprietors are rarely highly-skilled machinists, and because fairly complex spherical geometry can be involved, the proper and accurate drilling of proper size thumb and finger holes in desired locations at desired pitch angles has been tedious and time-consuming, and frequently has resulted in errors. Proper drilling of a bowling ball is further complicated by the fact that the desired distances are usually specified in special great circle or ball-surface hole edge-to-hole edge dimensions, while drill measurements must be related, of course, to drill centers, and the requirement that plural different hole sizes be used has prevented use of any simple means to take both a desired hole spacing distance and a hole size into account. While a variety of prior art devices have been suggested, all of them are believed to be quite complicated and difficult to operate, and quite unsuited to be operated by unskilled personnel. It is therefore a primary object of the invention to provide an improved ball-drilling machine into which an unskilled operator can set the conventional hole spacing and size information in its usual form, without any need to convert the information nor to inscribe lines or holes or other guide marks on the ball, and which an unskilled operator can guide easily to drill the thumb and finger holes in their desired locations.

It is a further object of the invention to provide a machine of the type described above into which the four main types of hole parameters (hole-size, span, web and pitch) may be set each by a single control, each set separately, one at a time, and each set independently and not reiteratively.

It is an additional object of the invention to provide a ball-drilling machine in which specific desired hole position and size parameters may be inserted, and in which no pattern or master reference ball need be provided. Using the invention, data respecting hole sizes and locations may be telephoned or otherwise conveniently transmitted to the drilling shop or factory, which may be situated remote from the customer and the measuring ball.

It is a related object of the invention to provide a drilling machine in which a minimum number of settings or inputs is required.

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

Figure 2:
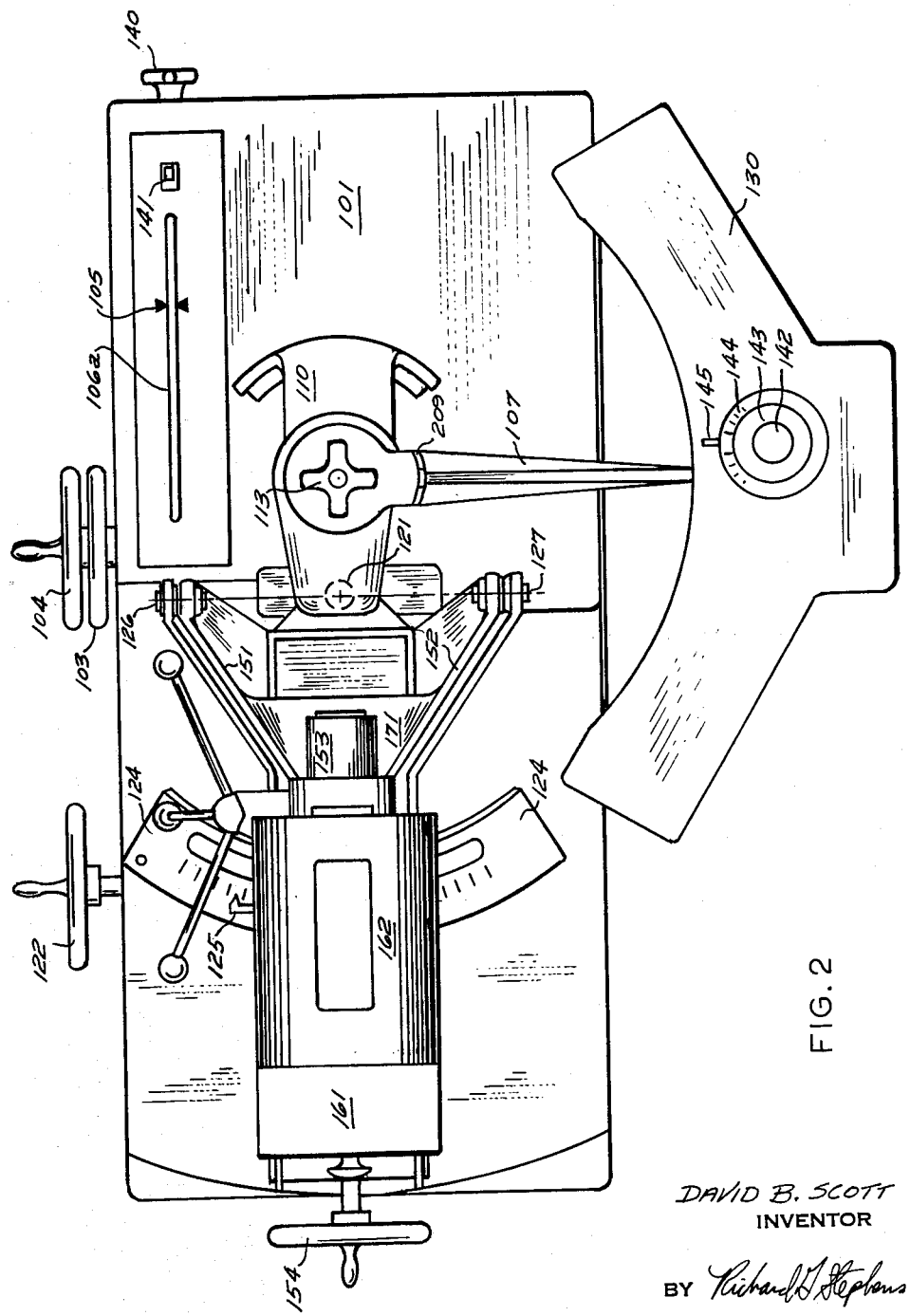
Figure 3:
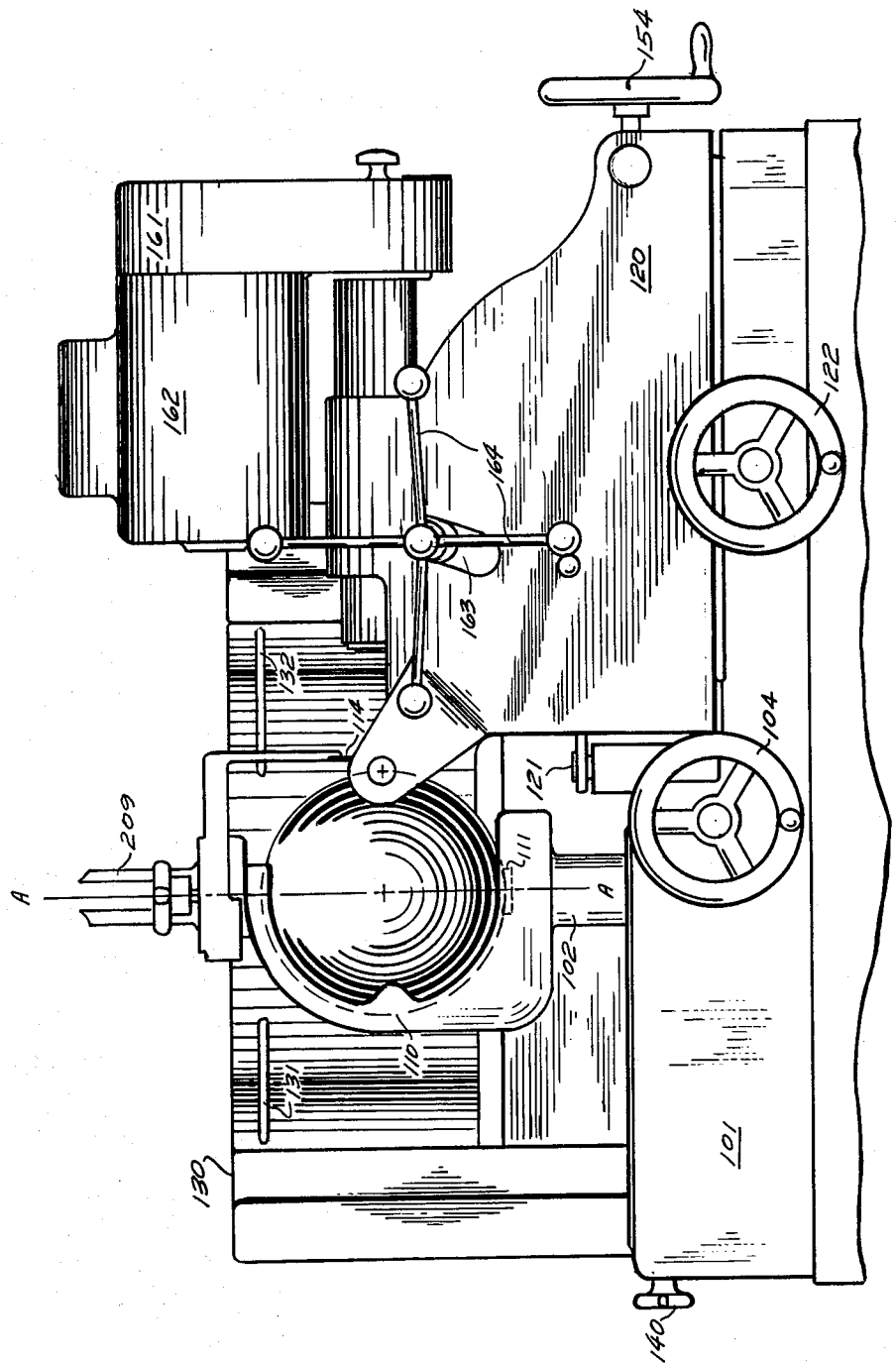
Figure 4:
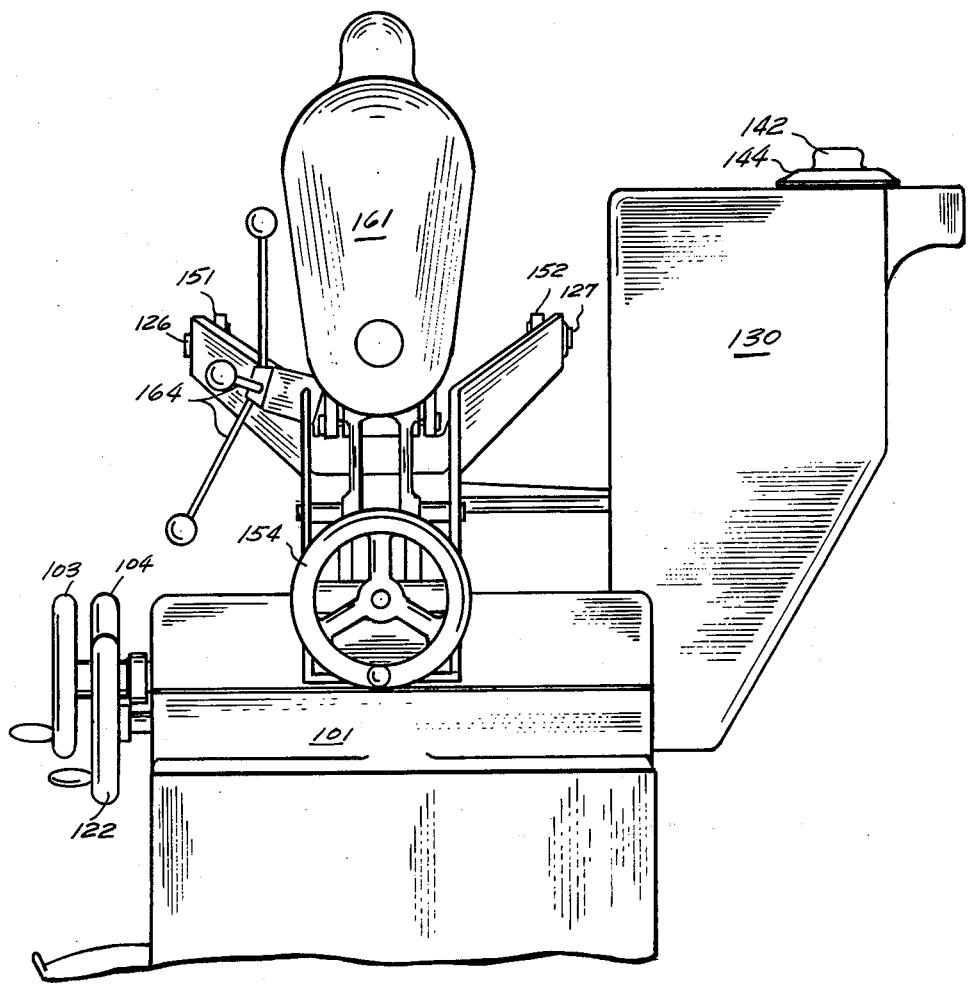
Figure 10A:
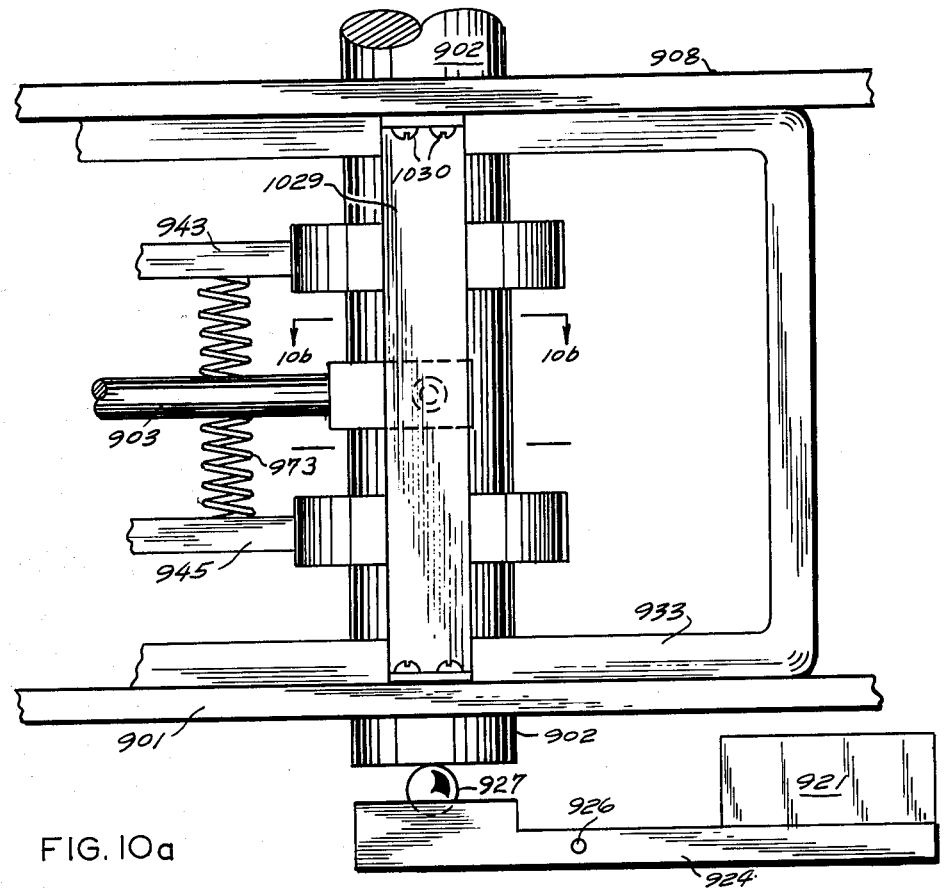
Figure 10B:
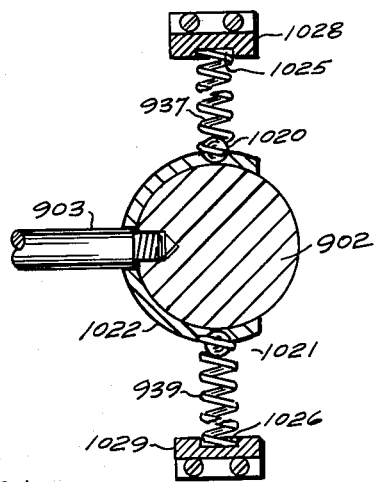

For a fuller understanding of the nature and objects of the invention, reference should be had to the following detailed description taken in connection with the accompanying drawings, in which:

FIG. 1 is a perspective view of one exemplary embodiment of the invention;
FIG. 2 is a plan view of the embodiment of FIG. 1;
FIG. 3 is a side elevation view of the embodiment of FIGS. 1 and 2;
FIG. 4 is an end elevation view of the embodiment of FIGS. 1–3;
FIGS. 5a and 5b are diagrammatic views useful for illustrating certain bowling ball geometrical relationships;
FIGS. 6a, 6b and 6c are geometrical diagrams useful in understanding hole "pitch."
FIGS. 7a, 7b, 7c and 8 are mechanical schematic diagrams illustrating exemplary mechanical linkage apparatus used in connection with the embodiment of FIGS. 1–4;
FIG. 9 is a perspective view of an alternative, preferred form of ball-positioning mechanism constructed in accordance with the invention;
FIG. 10a is a section view illustrating a portion of the apparatus of FIG. 9; and
FIG. 10b is a section view taken at 10b—10b in FIG. 10a illustrating a compression spring arrangement which may be used in the apparatus of FIGS. 9 and 10a.

Proper drilling of a bowling ball is complicated partly by the fact that the holes to be drilled must be properly located with respect to a reference mark on the ball, to insure that the ball will be balanced after the holes are drilled. To enable bowling balls to be balanced after being drilled, they normally are manufactured so that even though spherical, their weight is non-uniform, each ball being heavier on one side than the other, so that the ball will be approximately balanced after the holes are drilled. The weighted side is marked with an index or reference mark by the manufacturer in order that the finger holes will be placed on the proper side of the ball by the person who drills the gripping holes. The reference mark and the center of the ball define a reference plane. The thumb hole is usually drilled on this plane, while the finger holes usually are drilled equidistantly spaced on opposite sides of the plane, each at one-half the "web" distance.

The dimensions between ball holes, the sizes of the holes, and the angles of the holes are very important to most bowlers. A variety of measuring devices and techniques are commonly used to "fit" a bowling ball, by determination of some or all of the following measurements:

(1) Finger hole and thumb hole diameters.
(2) Span distance—the distance between the thumb hole and a finger hole, measured edge-to-edge along the ball surface in a manner to be shown.
(3) Web distance or width—the distance between two adjacent finger holes, measured edge-to-edge along the ball surface in a manner to be shown.
(4) Pitch—the angle between a hole axis and a ball radius which passes through the hole center at the ball surface. Thumb holes usually are given either forward or reverse pitch, as the bowler desires, to facilitate gripping and ball control by the bowler. Finger holes also are frequently drilled with either forward or reverse pitch. Forward and reverse pitch are measured in the x—x or equatorial plane. Somewhat rarer than provision of forward or reverse pitch is the provision of "side pitch," which is the canting away of a hole from the hole center at the surface to the ball center at an angle measured in the y—y or meridinal plane. Provision of desired side pitch has been so difficult in many prior art drilling arrangements that it has been neglected.

A ball shown in FIGS. 5a and 5b may be assumed to be bisected by a first plane through axis x—x and a second plane through axis y—y, both planes being perpendicular to each other and to the plane of the paper in FIG. 5a. The point P on the surface of the ball at which the two planes intersect is the ball index or zero point, about which the holes should be spaced for ball balance. For convenience of explanation, and ease of understanding of the dimensions involved, the directions of lines and points on the ball may be referred to in cartographic terms. For example, the $x$—$x$ axis may be designated the "equatorial" axis, and the plane passing through the $x$—$x$ axis and the center of the ball may be termed the "equatorial" plane. Analogously, the $y$—$y$ axis may be termed the meridinal axis. In the specific embodiments of the invention to be described in detail, the $y$—$y$ axis of the ball is always maintained *vertical* while the ball is being drilled, and the $x$—$x$ axis is maintained *horizontal*, but it should be clearly understood that machines constructed in accordance with the invention do not require the specific horizontal-vertical orientation shown, and may be mounted in a variety of other positions, so that the terms "horizontal" and "vertical" are solely exemplary.

As shown in FIG. 5 the thumb hole T as measured on the surface of the ball, is located on and bisected by the equatorial plane, with its center located a distance $l_1$ eastward from this index point P. Finger hole $H_1$ (usually the middle-finger hole for a right-handed bowler) is located westward of point P by distance $l_3$, and north of, or upward from the equatorial plane by distance $s_2$. The dimensions $l_1, l_2, l_3, s_1, s_2$, are all measured "great circle" fashion along the ball surface.

In fitting bowling balls, the dimensions important to the bowler, and those obtained from the most commonly used measuring balls and given to the driller, usually are somewhat different than those mentioned above. Instead, the distances between ball holes are specified in terms of "web" and "span." The web distance $w$ (see FIG. 5b) will be seen to be measured perpendicular to the equatorial or $x$—$x$ axis, from a horizontal line tangent to the uppermost edge of the $H_1$ hole to a horizontal line tangent to the lowermost edge of $H_2$ hole. It is usual practice for the equatorial plane to bisect the web distance. A typical web distance is ⅜". The "span" distance $d_1$ between thumb-hole T and finger-hole $H_1$ is measured as shown in FIG. 5b between points A and B, and the span distance $d_2$ between thumb-hole T and finger-hole $H_2$ extends between points B and C. Because the middle-finger of a human hand exceeds in length the ring-finger, a better grip may be provided and better ball control will result, if the thumb-to-middle finger span slightly exceeds the thumb-to-ring finger span. Therefore, it is common, and usually desirable, to provide a greater $d_1$ span than $d_2$ span on a ball drilled for a right-handed bowler, and conversely, to provide greater $d_2$ spans on balls drilled for left-handed bowlers. A typical span dimension for one finger hole might be say, 2¾ inches, with the other span dimensions perhaps ⅛ inch shorter.

Because of the varying dimensions of the fingers, an ideally fitted bowling ball usually requires three different hole diameters, the thumb hole diameter, of course, being largest, and the ring-finger hole the smallest. Typical thumb-hole, middle-finger hole and ring-finger hole sizes (for a "right-hand" ball) might be for example, ⅞", 1³⁄₁₆" and ¾", respectively. Because hole diameters are not all the same, and because the web and span distances are measured from the hole edges rather than the hole centers, and because the distances are measured in great circles on the surface of the ball, it will be seen the proper drilling of a bowling ball involves rather complex geometrical relationships, since any rotary drill bit must be positioned with reference to its center than with reference to its outside periphery. As will become more apparent as the description proceeds, by use of the invention one easily and quickly may space all the holes with respect to index point P so that point P bisects line BD. Point D is the projection of the $d_1$ span distance on the horizontal $x$—$x$ axis. It may be noted that theoretically perfect balancing of a ball about the $x$—$x$ plane would require either that both finger holes $H_1$ and $H_2$ have the same diameter and depth and be located equidistantly from the $x$—$x$ axis, or that their depths and locations compensate for their size difference. In practice it has been found that the usually small difference in diameter of the holes does not appreciably unbalance the ball, and the slight amount of unbalance may be compensated for by drilling the lesser diameter ring-finger hole slightly deeper than the middle-finger hole. Also, with respect to balancing of the ball about the $y$—$y$ plane, it will be seen that the larger diameter (and depth) of the thumb hole will tend to compensate for unbalance caused by their being *two* holes on the opposite side of the $y$—$y$ axis, so that eminently satisfactory balance may be obtained if the reference mark P in FIG. 5b bisects line BD.

As mentioned above, "pitch" is the angle between a hole axis and a ball radius which passes through the hole center at the ball surface. If a hole axis coincides with a line between the ball center and hole center at the ball surface, the hole is said to have "zero pitch." FIGS. 6a, 6b and 6c are composite section views taken through a ball, with the portion of each figure to the right of axis M—M showing a section taken at the plane which bisects the thumb hole T, and with the portion of each figure to the left of axis M—M showing a section taken at the plane which bisects finger hole $H_2$. FIG. 6a shows thumb hole T and finger hole $H_2$ directed precisely toward the ball center, thus having "zero pitch." If the thumb hole T drilling axis is directed toward the finger-hole side of the ball center, or if a finger-hole axis is directed toward the thumb-hole side of the ball center, such a hole is said to have "forward pitch," as shown in FIG. 6b, wherein both holes shown have forward pitch. If, instead, a thumb-hole axis is directed away from the finger-hole side of the ball center, or if the finger hole axis is directed away from the thumb-side of the ball center, the given hole will have "reverse pitch," as illustrated in FIG. 6c.

In the embodiment shown in perspective in FIG. 1 and orthogonally in FIGS. 2–4, the apparatus includes a base 101 upon which are mounted a ball support assembly shown generally at 110 and a drill carriage assembly shown generally at 120. Ball support 110 carries a circular seat or nest 111 which serves to fixedly locate a bowling ball (not shown) to be drilled. Clamping means in the form of an upper cap 112 is translated downwardly by tightening of knob 113 and is used to lock a ball in place in the clamping means, with the reference mark on the ball aligned with cross-hairs (not shown) on transparent guide window 114. Knob 113 rotates shaft 113a, which is threaded through the upper end of support 110, and cap 112 is carried on the end of shaft 113a. The ball, once clamped in position, remains locked in ball support 110 throughout the drilling of all the holes to be drilled in the ball. Manual manipulation of a bowling ball to align the manufacturer's reference mark with crosshairs or like indices is a relatively clumsy operation, and it is an advantage of the present invention that the task need be performed but once for the entire drilling of a ball, rather than for each hole, as is the case with some prior art devices. In the invention, all adjustments required after initial alignment of the ball index mark with the cross-hairs on window 114 can be made simply and precisely, with a minimum of manual dexterity, merely by turning handwheels or cranks and making similar simple adjustments, one at a time.

Aligning the ball index mark P with the cross-hairs on window 114 serves to position the ball on its side, so that a view taken toward the ball from the drill end of the machine presents the ball face in the manner shown in FIG. 5a. The cross-hairs on guide 114 are aligned with the $x$—$x$ and $y$—$y$ axes of FIG. 5a, with the cross-hair intersection at point P. As will now be explained, the ball support and ball are adjusted vertically so that the drill bit axis will intersect the $x$—$x$ or equatorial plane when the thumb hole T is being drilled, and adjusted up and down so that the drilling axis is below and above the $x$—$x$ plane when drilling finger holes $H_1$ and $H_2$, respectively. Thus it will be seen that vertical translation of the ball is used to establish the desired "web" dimension W.

The desired span dimensions, though not measured parallel to the $x$—$x$ axis, are effected by rotation of the ball about a vertical axis A—A through the ball center. When the machine is set to a zero span condition, substantially as shown in FIG. 1, the drill axis intersects the cross-hair axis, and the drill, if it were to be advanced, would drill a hole precisely at index point P in FIG. 5a. It will be seen from FIG. 5a, that rotation of the ball westwardly through the arc $l_1$ about a vertical axis through the ball center will serve to position the ball so that thumb hole T may be drilled, and assuming then that proper web settings are provided in the manner discussed above, rotation of the ball eastwardly from the zero span condition through arcs $l_2$ and $l_3$ will serve to position the ball so that finger holes $H_1$ and $H_2$ may be drilled.

It is a feature of the invention that even though span dimensions are not measured along the $x$—$x$ axis, span is determined in the machine by rotation of the ball about axis A—A, rather than about axes perpendicular to lines AB and BC in FIG. 5b, since the disclosed arrangement is mechanically far simpler. It will be seen from FIG. 5b that distance BD measured along the $x$—$x$ axis will closely approximate span distance AB, with only a small cosine error, if AB (or BD) is large compared to the half-web distance AD. Because desired span dimensions are always large compared to desired web dimensions, the $\gamma$ is small, so that small error results from rotating the ball about an axis perpendicular to the $x$—$x$ plane. A typical ratio between span distance and half-web distance is of the order of 14 to 1. Because, however, human hands tend to grow proportionally, the ratio between span and web dimensions does not vary greatly between most drilling orders, and hence a typical ratio may be assumed and used as a compensation factor in calibrating span measurement scales or dials, so that the cosine error, already small, becomes insignificant.

Ball support 110 is mounted on vertical shaft 102, which extends upwardly to ball support 110 from beneath base 101. Rotation of "web" handwheel 103 operates to translate shaft 102 and ball support 110 upwardly and downwardly, by means shown and explained in connection with FIG. 7. Ball support 110 and shaft 102 also are free to rotate about the axis A—A (see FIG. 3) of shaft 102, unless lock wheel 104 is turned to a locking position, which prevents both rotation and translation of shaft 102, in a manner to be explained below in greater detail in connection with FIG. 7. The upward or downward translation of shaft 102 and ball support 110 from a zero web position is indicated by a pointer 106b (not shown in FIGS. 1–4) visible through slot 106a in scale 106. The rotation of shaft 102 and ball support 110 carries span pointer arm 107, which is rigidly attached to ball support 110. Pointer arm 107 carries a vertically extending pointer 108, the upper end of which provides an index line adapted to be aligned with certain indicating marks present behind windows 131 and 132 of cover 130. Means to be described below serve automatically to position the indicating marks within windows 131 and 132 in accordance with certain hole size and span information set into the machine, and then rotation of span pointer 107 and ball support 110 to line up the index line of pointer 108 with the indicating mark in one of windows 131 or 132 correctly rotates the ball throughout the angle necessary to provide the desired "span" dimension. Sight 209 carried on ball support 110 enables the operator to avoid parallax error while aligning pointer 108 with the indicating marks in windows 131, 132 by tending to constrain the operator to sight parallel to arm 107. It may be noted that the span and web adjustments of the machine are completely independent of each other, so that the machine operator is not constrained to adjust either dimension reiteratively. Hole size, which is set to correspond with the size drill to be used, is set in by means of knob 140, while reading a scale through window 141. The desired span dimensions for the two finger holes ($H_1$, $H_2$) may be set in by rotating knurled knob 142 to align desired numbers on dials 143 and 144 with index mark 145. It is highly desirable, in order that unskilled operators be able to drill balls properly, that only the precise "order information," i.e., hole sizes, web, span and pitch, need be set into the machine, and that none of the figures on the drilling order need be halved or doubled or otherwise mathematically manipulated in order to adjust the machine.

Drill carriage 120 is pivotally mounted on vertical shaft 121 (see FIG. 3) the center of which is located 4 and 9/32 inches, the radius dimension of a standard bowling ball, from the center of shaft 102. Thus rotation of drill carriage 120 about vertical shaft 121, by rotation of handwheel 122, serves to rotate the drill carriage about a point on the periphery of, or tangent to, the ball (not shown) clamped in ball support 110. The shaft rotated by handwheel 122 is threaded through a traveling nut (not shown) under base 101, and the nut is slidably connected to carriage 120 through an opening in the top of base 101. Since a variety of equivalent mechanical connections are well known and may be substituted, these connections need not be shown in detail. The rotation of drill carriage 120 about shaft 121 serves to provide the pitch angle (if any) desired for each of the holes to be drilled. Pointer 125 indicates against scale 124 the angular position of carriage 120 about shaft 121, and hence the pitch distance to which the machine is adjusted. It may be noted that pitch adjustment of the drill carriage is completely independent of the web and span adjustments.

Stub shaft 126, 127 journalled in drill carriage 120 support yoke member arms 151, 152 of base 171, upon which drill spindle 153 is mounted, journalled in pedestal 172. Rotation of handwheel 154 serves to pivot member 171, drill spindle 153 (and the chuck and drill, not shown) about the axis of stub shafts 126, 127. As best seen in FIG. 3, the axis of shafts 126, 127 is perpendicular to and intersected by the axis of shaft 121, so that adjustment of the drill spindle about the axis also is about a point on the surface of the ball. In this way the side pitch of the finger holes may be adjusted. The complexity of many prior art drilling arrangements has made provision of desired "side pitch" angles so tedious and time-consuming that many bowling ball drillers have not attempted to provide desired side pitch to their customers. In the interests of economy, the side pitch adjustment capability may be eliminated from some embodiments of the invention.

Drill spindle 153 is connected in conventional fashion via gearing means inside housing 161 to be driven by electric motor 162. Drill feed control shaft 163 is rotated by arms 164, 164, rotating pinion 165 (not shown) which meshes with a stationary rack 166 (not shown) carried on pivotable frame member 171, thereby translating spindle 153 along the drill axis.

Spindle 153 may be provided with a chuck, such as a conventional Jacobs chuck, for example, to carry drill bits, but a preferred arrangement instead uses a hollow spindle with an internal taper, so that conventional Morse tapered-shank drills may be inserted and then withdrawn from the hollow spindle by means of an ejector rod inserted through the rear end of the spindle.

FIGS. 7a and 7b illustrate in highly schematic plan and elevation views, mechanisms which may be located inside base 101 of the embodiment of FIGS. 1–4. Certain parts have been altered so that the operating principles will be clear, and because a wide variety of equivalent mechanisms may be substituted for those shown. Drill size control knob 140 is shown connected to rotate shaft 701 which is journalled in the end of housing 101, thereby rotating cylindrical dial 702, upon the outer surface of which a range of drill sizes are inscribed. For example, seventeen (5/8" to 1 and 1/8") drill sizes, graduated in increments of 1/32" may be inscribed on dial 702. The operator turns control knob 140 until the desired hole size is visible through window 141 in the top of base housing 101 (see FIG. 1). Such rotation of shaft 701 is transmitted to affect the indication provided by web dimension indicator 106, by means shown in FIGS. 7a and 7b as comprising gears 704, 705 which rotate threaded shaft 707, thereby translating scales 708 and 709, which are provided with traveling nut portions 710 and 711 engaged by shaft 707. The portion of shaft 707 which engages traveling nut 710 is oppositely threaded from the portion through traveling nut 711, so that rotation of drill size knob 140 in one direction spreads scales 708 and 709 apart, while rotation in the opposite direction draws scales 708 and 709 together. Brackets 712, 712 support scales 708 and 709 and prevent rotation of the brackets and their traveling nut portions as shaft 707 rotates.

Rotation of web control knob 103 (FIG. 1) rotates the outer shaft 720 of a pair of concentric shafts 720, 722. The inner end of shaft 720 is threaded and passes through a traveling nut which is pivotally carried in the generally vertical arm of bell crank 724, which is journalled on pins 726, 726 fixedly supported from housing 101. The generally horizontal arm of bell crank 724 terminates in a yoke portion 728 which is pinned to a collar 729 surrounding vertical shaft 102. Collars 727a and 727b are pinned to shaft 102 immediately above and below collar 729. Thus it will be seen that rotation of shaft 720 by means of web control knob 103 will operate to translate shaft 102, and hence ball support 110, upwardly and downwardly, while still leaving shaft 102 free to rotate about its own axis.

A further traveling nut 730 on shaft 720 is pivotably carried in a yoke end of bell crank 732, which is mounted to housing 101 to pivot about a vertical axis of shaft 734, thereby to reciprocate web pointer 740, which is connected to a vertical rod 739, which extends upwardly from the end of rod 738, which is slidingly supported from frame 101 by pedestal 737 and connected to a slotted end of bell crank 732. Because scales 708 and 709 are moved by drill size control knob 140 and pointer 740 is moved by web control wheel 103, it will now become apparent that the reading of pointer 740 against either scale 708 or 709 will take into account both adjustments, and that by proper calibration of scales 708 and 709, the web distances indicated thereon by pointer 740 will automatically compensate for different desired drill hole sizes. Because the web distance should be bisected by the ball equatorial or x—x plane, the gearing or scaling factor between vertical shaft adjustment of shaft 102 and the calibration of web distance on scales 708 and 709 is made 1:2, so that, starting from zero web position of pointer 740, the cranking of wheel 103 until the desired total web distance is indicated on either scale 708 or scale 709 will raise or lower the ball only half the total web distance. Housing 101 is provided with a center "zero-web" or "thumb" mark 105 (FIG. 1) midway between scales 708 and 709 are marked with scales increasing in dimension in both directions from the "zero-web" mark. Because the thumb hole is drilled on the ball equatorial plane irrespective of drill hole size, web control knob 103 is rotated to locate pointer 740 adjacent the "zero web" mark when the thumb hole is to be drilled. When a finger hole is to be drilled, however, web control knob 103 is rotated to position web pointer with respect to either scale 708 or 709.

Lock wheel 104 is connected to rotate inner shaft 722, which passes through hollow shaft 720 and terminates with gear 751. Gear 751 drives threaded shaft 753 which is journalled in pedestal 755, through gear 752, either to tighten or loosen clamp 756, which surrounds shaft 102. Tightening of clamp 756 will be seen to prevent both rotation and vertical translation of vertical shaft 102, so that forces applied to the ball by the drill neither rotate nor translate the ball. Also carried on shaft 701 is sprocket 758, which is connected by means of chain 759 to drive sprocket 760 and shaft 761, for a purpose to be made clear in connection with FIG. 8. Rotation of drill size control knob 140 to rotate shaft 701, sprocket 758, and sprocket 760 via chain 759 also rotates drum dials 763 and 764 through Bowden cables 765 and 766. Dial 763 is mounted opposite slot 131 and dial 764 is mounted opposite slot 132 (see FIG. 1). Each of dials 763 and 764 are inscribed with calibrating lines 763', 764' spiraled around their respective dials, so that rotation of dials 763 and 764 shifts rightwardly or leftwardly the portion of lines 763' and 764' visible through slots 131 and 132. Lines 763' and 764' spiral in opposite directions around their respective drums, so that a given rotational displacement of drill size knob 140 moves the visible portion of one spiral line rightwardly while moving the visible portion of the other leftwardly. Specifically, increasing drill size settings spread apart the visible portions, while decreasing settings move them closer to each other.

As well as being rotated by drill size knob 140, drum dials 763 and 764 are shifted substantially axially by means of span knob 142 and dial 144, as shown in FIG. 8. Rotation of thumb span knob 142 to align a given dimension on scale 143 with index mark 145 (FIG. 1) rotates pinion 801, thereby translating rack 803, which carries, and thereby translates drum 764. Because drum 764 is translated by span control knob 142 and because the visible portion of line 764' is shifted by rotation of drill size knob 140, rotation of arm 107 so as to align pointer 108 with the portion of slot 764' visible through slot 132 serves to rotate shaft 102 (and the ball support and ball) through the correct angle to provide a desired span dimension, automatically taking into account the effect of drill size variations. Rotation of span knob 142 and pinion 801 also translates rack 804 in the opposite direction from translation of rack 803, thereby translating drum 763. Because drum 763 is translated by span control knob 142 and because the portion of spiral line 763' visible through slot 131 is shifted by rotation of drill size knob 140, rotation of arm 107 to align pointer 108 with the visible portion of line 763' serves to rotate shaft 102 (and the ball support 110 and ball) through the correct angle to provide the desired span dimension for the first of the two finger holes, while automatically taking into account the effect of variation in hole size diameter on the span dimension. Increasing span settings move the drums away from each other, and decreasing span settings move the drums toward each other. By providing a scale for the second finger hole span on dial 144, and by setting such scale with respect to scale 143, rotation of the knob 142 before drilling the second finger hole will enable the operator to provide the slightly shorter or longer thumb-to-#2 finger span desired, with the effect of drill size diameter again automatically taken into account.

FIG. 9 illustrates in schematic form, with certain parts removed for sake of clarity, an alternative, preferred form of the ball-positioning portion of the invention. The preferred embodiment may utilize a pivotable drill carriage and drill advancing mechanism (neither of which is shown in FIG. 9) of the same nature as those shown in FIGS. 1–4.

The ball-positioning mechanism of FIG. 9 is located on a base 901, which may consist of merely a flat plate, which may be mounted on feet to provide some clearance below, since all of the operating mechanisms in FIG. 9 may be provided above the base and only a single shaft protrudes through the base. The ball to be drilled is mounted in a ball clamp (not shown) which may take the form of clamp 110 of FIGS. 1–4, and the ball clamp is mounted for rotation and vertical translation about and along the axis of shaft 902, which corresponds generally to shaft 102 of FIGS. 1–4. Only shaft 902 need extend below base 901, together with a counterweight mechanism to be described below.

Both rotation of shaft 902 to adjust span dimensions, and vertical translation of shaft 902 to adjust the desired web dimension, are accomplished in the apparatus of FIG. 9 by movement of rigid rod 903, which extends inwardly toward shaft 902 from handle 904, and which is rigidly attached to shaft 902. Vertical movement of handle 904 and rod 903 moves main shaft 902 vertically, and left-right movement of handle 904 and rod 903 rotates shaft 902 about its axis. A spring and counterweighting system to be described below tends to hold handle 904 and rod 903 in the vertical and angular positions to which they are moved. Rod member 903 is provided with a reciprocating, tapered cam follower block 905, which may be adjusted in position along shaft 903 by means of rack 907, which is translated by rotation of "Hole Size" dial 910. Dial 910 is inscribed with the desired range of drill sizes, and rotation of dial 910 to position a desired drill size mark adjacent index mark 911 serves to position tapered block 905 to a selected position along rod 903. Dial 910 is journalled on rod 903 by means of shaft 912, and pinion 913 carried on shaft 912 reciprocates rack 907. A keyway 916 may be provided to prevent rotation of tapered block 905 around rod 903, or alternatively, row 903, and its cooperating bore through cam follower block 905, may be provided with non-circular cross-sections. Block 905 is tapered both horizontally and vertically, and has the shape of a truncated pyramid, for reasons to be made clear below.

Adjustment of shaft 902 (and hence the ball support and ball) to the "zero web" vertical position and the desired span position for drilling the thumb hole is accomplished by moving handle 904 to the right in FIG. 9, so that face 923 of cam follower block 905 rests against surface 922 of stop pad 924, and so that shaft 903 is nested in slot 925 between projections 926, 927 on the inside of the wall 931 of casting 930. Casting 930 consists of upper arm portion 932, side wall portion 931 and lower arm portion 933. The upper and lower arm portions 932 and 933 both extend to and surround shaft 902, so that casting 930 is rotatable about shaft 902. Casting 930 is prevented from moving vertically by being mounted between base plate 901 and upper frame plate 908, as best shown in FIG. 10. It will be seen that translation of rod 903 so that it rests in slot 925 will serve to accurately fix the vertical position of shaft 902, and hence position the ball vertically so that the thumb hole will be accurately located on the ball x—x axis. Provision of an accurate span location for the thumb hole is effected by positioning of thumb span cam 935, which controls the angular limit position of casting 930 on shaft 902, and hence the angle through which the ball is turned before face 923 of tapered block 905 strikes face 922 of stop pad 924. As will be evident from FIG. 9, thumb span cam 935 is angularly positioned by rotation of "Thumb to No. 1 Finger" control knob 937, which is rigidly connected to cam 935 by shaft 938. Shaft 938 also rotates dial 940, which has span dimensions inscribed on its periphery, thereby indicating the "Thumb to No. 1 Finger" span dimension to which the machine is set, through a window in fixed dial shield 941, which may be fixedly mounted on a cover housing (not shown). Rotation of knob 937 also angularly positions gear 942 on shaft 938, thereby translating rack 934, for a purpose to be described below.

For the purpose of drilling the finger holes with proper web and span dimensions, upper and lower arm members 943 and 945 are rotatably mounted on shaft 902, and respectively limited to individual angular positions about shaft 902 by means of upper and lower finger span cams 947 and 949, respectively. Arms 943 and 945 are provided with vertically widened camming pad portions 980 and 981, so that cams 947 and 949 will continue to register with arms 943 and 945 as arms 943 and 945 are moved downwardly and upwardly to accomplish web adjustment, as will be explained presently. Rotation of "Thumb to No. 2 Finger" span knob 946 rotates span cam 947 via shaft 948, thereby determining the limit angular position of arm member 943, and also rotates dial shield 950. A rotatable sleeve or collar 951 floatably mounted on shaft 948 carries pinion 952, which meshes with rack 934, and also rotates dial 953.

Shown in FIG. 9, thumb span shaft 938 as well as rotating thumb span cam 935, rotates a further pinion 960, which meshes with a further rack 961, which rotates pinion 962, shaft 963, and a lower cam 949, thereby determining the limit angular position of arm member 945, and hence the correct span location of the No. 1 finger hole.

In order to provide proper web locations of the finger holes, arms 943 and 945 are slidable vertically on shaft 902, and upper and lower adjusting screws 971 and 972 on casting 930 determine the vertical positions of arms 943 and 945, respectively. Inward rotation of upper web adjust screw 971 moves upper arm 943 downwardly, and inward rotation of lower web adjust screw 972 moves lower arm 945 upwardly. A compression spring 973 between arms 943 and 945 holds arm 943 up against screw 971 and holds arm 945 down against screw 972. Scales 974 and 964 provided adjacent screws 971 and 972 indicate the vertical positions of arms 943 and 945. Scales 971 and 972 may be calibrated in actual dimensions and the operator given instructions to set each to one-half of the order web dimension, or the scales may be provided with double-expanded scales, and the operator instructed to set the ordered web dimension on each.

When the No. 1, or lower finger hole is to be drilled, control handle 904 will be moved leftwardly from the reference position shown in FIG. 9, so that the left and lower faces of cam follower block 905 rest against faces 975 and 976, thereby determining both the angular and vertical positions of shaft 902. When the upper, or No. 2 finger hole is to be drilled, control handle 904 will be moved leftwardly and upwardly from the position shown in FIG. 9, so that the left and upper faces of block 905 rest against faces 977 and 978, thereby determining both the angular and vertical positions of shaft 902 for the No. 2 finger hole.

Because reciprocating block 905 is tapered in a vertical sense, it will be seen that the hole size setting on dial 910 will affect the vertical position of shafts 903 and 902 (and hence the ball) whenever block 905 is seated against face 978 to drill the No. 2 finger hole or seated against face 976 to drill the No. 1 finger hole, and thus the apparatus of FIG. 9 automatically compensates the web setting to take finger hole size into account. However, since the vertical position of shafts 902 and 903 is determined solely by slot 925 and not at all by tapered block 905 when the thumb hole is drilled, the thumb hole will be accurately located on the ball x—x axis irrespective of thumb hole size. Because block 905 is tapered in its horizontal dimensions, it will be seen that the hole size setting of dial 910 will affect the limit angular positions of shaft 902 when either the thumb hole or either finger hole is being drilled, and hence the span settings will be automatically compensated or corrected to take hole sizes into account.

As explained above, rotation of "Thumb to No. 1 Span" knob 937 translates rack 934, which rotates gear 952, collar 951 and dial 953, thereby affecting the "Thumb to No. 2 Span" indication observable through dial shield 950. Shaft 938 is geared 3:1 to dial 953, by providing gear 942 with three times as many teeth as gear 952. As shown in FIG. 9, shaft 938 is geared 1:1 with shaft 963 and cam 949. The adjustment of control knob 937 positions cams 935 and 949 so that the thumb to No. 1 finger hole span dimension projected on the x—x axis (dimension BD in FIG. 8b) will be bisected by the ball index mark P, and then rotation of knob 946 to the desired "Thumb to No. 2 Span" setting provides the slightly shorter ring-finger span required by right-handed bowlers or the slightly longer middle-finger span required by left-handed bowlers.

While the embodiment of FIG. 9 is shown as including adjustable stops which enable the operator to position the ball properly for drilling, it should be recognized that each adjustable stop may be replaced by an adjustable indicator without departing from the invention. For example, projections on block 905 and stop 924 could each be inscribed with index lines, and arm 903 moved until the lines coincided without hitting a stop, and then shaft 902 could be locked in place, by means of a clamp, for example, as shown in FIG. 7a. The use of stops is preferred, however, since it eliminates the need for such locking means, and obviates errors which might occur due to faulty alignment of pairs of index marks.

FIG. 10a is a section view through the apparatus of FIG. 9 showing an exemplary manner in which various of the portions of the exemplary apparatus of FIG. 9 may be mounted. In FIG. 9 shaft 902 is shown mounted vertically and extending up through base plate 901, through the lower portion 933 of casting 930, through rotatable No. 1 Finger Span arm 945, through rotatable No. 2 Finger Span cam 943, through the upper portion 932 of casting 930, and through upper frame 908, and thence upward, to support a ball clamp and ball (not shown). Disposed between rotatable arms 943 and 945 is compression spring 973, which urges arm 943 upwardly against adjusting screw 971 (FIG. 9) and urges arm 945 downwardly against adjusting screw 972 (FIG. 9).

In order to facilitate vertical adjustment of shaft 902 and the ball by vertical movement of control rod 903, shaft 902 is shown counter-weighted by means shown as comprising counterweight 921 and lever 924 pivoted at 926, which is connected to apply an upward force to shaft 902 through ball-connection 927. The mass of counterweight 921 is selected with respect to the weight of the ball support and ball so as substantially to compensate or counteract the ball and ball support weight, so that control rod 903 may be raised and lowered easily.

As shown in FIGS. 10a and 10b, the vertical and angular positions of shaft 902, and hence the ball support and ball, are spring-biased by means of a pair of compression springs 937 and 939, which act between the machine frame and shaft 902. The inner ends of springs 937 and 939 are seated within respective recesses 1020 and 1021 in a partial collar 1022 which is fixedly attached to shaft 902, and the outer ends of the springs are seated in respective recesses 1025, 1026 in rigid column members 1028 and 1029, which are located on opposite sides of shaft 902 and which are fixedly fastened to the machine frame, as by means of screws 1030, 1030 (FIG. 10a). As best seen in FIG. 10b, compression springs 937 and 939, which are substantially identical to each other, are arranged to oppose each other, so that each spring acts in a direction or along an axis which intersects the axis of main shaft 902 when shaft 902 is in the neutral angular position at which shaft 902 positions the ball with index point P opposite the drill, in its reference position. Thus when control rod 903 is in its reference position, springs 937 and 939 exactly oppose each other, providing no net rotational couple on shaft 902. However, if shaft 902 is rotated from the neutral position, the inner ends of compression springs 937 and 939 are translated, either clockwise or counter-clockwise, thereby redirecting the lines of action of the springs and applying a force couple to shaft 903. Thus if control handle 904 and shaft 902 is moved slightly leftwardly in FIG. 9 from the neutral position shown, the force couple applied to shaft 902 will tend to move handle 904 even further leftwardly, and thereby rotate control handle 903 until tapered block 905 strikes either pad 980 or 981. Conversely, if handle 904 is moved rightwardly in FIG. 9 from the center or balanced position, springs 937 and 939 apply a force couple which rotates control rod 903 to seat it in slot 925 and against stop pad 924.

As well as urging shaft 903 angularly, compression springs 937 and 939 operate to urge shaft 903 vertically to either an upper limit or a lower limit. Springs 937 and 939 are attached between shaft 903 and the machine frame so that the two springs act against each other in the same horizontal plane and perpendicular to the axis of shaft 903 when shaft 903 is in the reference vertical position to position the ball $x$—$x$ plane versus the machine drill, and so that the springs urge shaft 902 upwardly if control rod 903 is moved slightly upwardly from such a neutral position, and so that the springs urge shaft 902 downwardly if control rod 903 is started downwardly from such neutral position. Thus it will be seen that the same compression springs 937 and 939 are arranged to urge to shaft 902 in both vertical and angular directions. Because the reference mark on the ball is aligned with index means on the ball support rather than being aligned with respect to the drill, it is quite unnecessary that rod 903 and handle 904 be stable in any reference angular and vertical positions. Because compression springs 937 and 939 essentially oppose each other, the forces applied to shaft 902 do not tend to cant the shaft or cause it to stick in its bearings.

It will thus be seen that the objects set forth above, among those made apparent from the preceding description, are efficiently attained, and since certain changes may be made in the above constructions without department from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Bowling ball drilling apparatus, comprising in combination: a base; a drill carriage pivotally mounted on said base to pivot about a first axis, said drill carriage including drill feed means for advancing a drill tool along a second axis; ball support means mounted on said base for supporting a bowling ball in a reference position with respect to said ball support means, said ball support means being rotatable about and translatable along a third axis which is parallel to said first axis and which passes through the center of said ball; and means for providing a relative displacement between said drill carriage and said ball support means in a direction parallel to said first axis, said first axis being located so as to be tangent to said bowling ball at a first point on the exterior surface of said bowling ball.

2. Apparatus according to claim 1 in which said drill feed means is positionable adjustably with respect to said drill carriage to allow rotation of said drill feed means about a fourth axis, said fourth axis being tangent to said bowling ball and located to intersect said first axis at said first point and perpendicular to said first, second and third axes.

3. Apparatus according to claim 1 having index means on said ball support means to indicate a proper reference position of a ball with respect to said ball-holding means.

4. Apparatus according to claim 1 having a hole pitch indicator responsive to pivotal movement of said drill carriage about said first axis.

5. Apparatus according to claim 1 having first dial means adjustable in accordance with a desired span dimension; second dial means adjustable in accordance with a desired finger hole size, one of said dial means being connected to displace the other of said dial means to position an indicating mark in accordance with both said desired span dimension and said desired finger hole size; and means rotatable with said ball and ball-holding means about said third axis for alignment with said indicating mark to determine the location of the finger hole in said ball.

6. Apparatus according to claim 1 having first dial means adjustable in accordance with a desired finger hole size to position an indicating mark; and an indicator movable with respect to said indicating mark in accordance with movement of said ball and ball-holding means parallel to said first axis, thereby to determine the web dimension of the holes to be drilled in said ball.

7. Bowling ball drilling apparatus, comprising in combination: a base; a ball means mounted on said base, said ball-holding means being adjustable rotatably relative to said base about a first axis and translatable relative to said base along said first axis, said ball-holding means being adapted to locate a ball with said first axis passing through the center of said ball; and a drill carriage pivotally mounted on said base, said drill carriage including reciprocable drill feed means for advancing a powered drill bit toward said ball to enter said ball with an angle of penetration determined by the pivotal position of said drill carriage, said drill carriage being arranged to pivot about a second axis parallel to said first axis and tangent to the periphery of a standard diameter ball located by said ball-holding means.

8. Apparatus for drilling spherical objects and the like, comprising in combination: a base; a tool carriage pivotally mounted on said base to pivot about a first axis, said tool carriage including tool feed means operable to advancing a material cutter along a second axis; object support means mounted on said base for holding a spherical object to be drilled, said tool carriage being so located with respect to said object support means that said first axis is tangent to the periphery of a standard-diameter object at a first point, and said second axis being relatively locatable adjustably so as to pass through said object adjustably along the centerline of said object measured in the direction of said first axis; means for moving said object support means in a direction parallel to said first axis to locate said second axis at a desired location along said centerline, said object support means being rotatable about a third axis parallel to said first axis and passing through the center of said ball.

9. Bowling ball drilling apparatus, comprising in combination: a base; a drill carriage pivotally mounted on said base pivot about a first axis, said drill carriage including drill feed means for advancing a drill bit along a second axis within a plane perpendicular to said first axis; ball-holding means mounted on said base for supporting a bowling ball in a reference position with the edge of said ball tangent to said first axis, said ball-holding means being rotatable about a third axis parallel to said first axis, perpendicular to the plane of said second axis and passing through the center of said ball; first dial means adjustable in accordance with a desired span dimension; second dial means adjustable to receive a desired thumb-hole size, one of said dial means being connected to displace the other of said dial means to position an indicating mark in accordance with both said desired span dimension and said desired thumb-hole size; and means rotatable with said ball about said third axis for alignment with said indicating mark to determine the thumb-hole location.

10. Apparatus according to claim 9 having adjustable means connected to pivot said drill carriage about said first axis; and indicator means responsive to pivotal movement of said drill carriage about said first axis to indicate drill hole pitch.

11. Bowling ball drilling apparatus, comprising in combination: a base; a drill carriage mounted on said base and including drill feed means for advancing a drill tool; ball-positioning means mounted on said base, said ball-positioning means including a shaft and ball support means mounted on said shaft being slidably mounted to be rotatable relative to said base and drill carriage about the axis of said shaft and independently translatable relative to said base and drill carriage along the axis of said shaft; control means for rotating and translating said shaft and said ball support means from reference positions; and adjustable means for determining the limits of rotation and translation of said ball support means.

12. Apparatus according to claim 11 in which said drill carriage is pivotally mounted on said base to pivot about a second axis which is parallel to said axis of said shaft and tangent to the periphery of a standard diameter ball carried in said ball support means.

13. Apparatus according to claim 11 in which said control means includes movable means connected to rotate said ball support means from a reference position and in which said adjustable means includes a positionable stop adapted to determine the limit of movement of said movable means to a second position, thereby to limit rotation of said ball support means about said axis of said shaft to a desired span dimension.

14. Apparatus according to claim 11 in which said control means includes movable means connected to translate said ball support means from a reference position and in which said adjustable means includes a positionable stop adapted to determine the limit of movement of said movable means to a second position, thereby to limit translation of said ball support means along the axis of said shaft to a desired web dimension.

15. Apparatus according to claim 13 in which said movable means includes means adjustable in accordance with a desired hole size to vary the amount of movement of said movable means between said reference position and said second position in accordance with said desired hole size.

16. Apparatus according to claim 14 in which said movable means includes means adjustable in accordance with a desired hole size to vary the amount of movement of said movable means between said reference position and said second position in accordance with said desired hole size.

17. Apparatus according to claim 12 in which said control means includes movable means connected to rotate said ball support in two opposite directions from a reference angular position, a first positionable stop adapted to determine the limit of movement of said movable means in one of said two directions, and second and third positionable stops selectable to limit movement of said movable means in the other of said two directions.

18. Apparatus according to claim 17 in which said movable means includes means adjustable in accordance with a desired hole size to vary the amount of movement of said movable means between said reference position and each of said positionable stops.

19. Apparatus according to claim 11 in which said control means includes movable means connected to rotate said ball support in two opposite angular directions from a reference angular position and connected to translate said ball support in two opposite linear directions from a reference translational position; a first adjustable stop member for limiting rotation of said ball support in a first of said two angular directions; and a second angularly-adjustable translationally-fixed member connected to said first adjustable member for positioning said ball support in said reference translational position when said movable means is rotated to engage said first adjustable member.

20. Apparatus according to claim 11 in which said control means includes movable means connected to rotate said ball support in two opposite angular directions from a reference angular position and connected to translate said ball support in two opposite linear directions from a reference translational position; a first adjustable member for limiting angular rotation of said ball support in a first of said two angular directions and for determining the limit of translational movement of said ball support in a first of said two opposite linear directions when said movable means is moved in said first linear direction and in said first angular direction; and a second adjustable member for limiting angular rotation of said ball support in said first of said two angular directions for determining the limit of translational movement of said ball support in the second of said two opposite linear directions when said movable means is moved in said second linear direction and in said first angular direction.

21. Apparatus according to claim 11 including a pair of compression springs connected between said base and said shaft, said pair of springs being arranged to oppose each other when said shaft is in a reference angular position, and to apply a force couple to said shaft to urge said shaft toward one of said limits of rotation when said shaft is rotated from said reference angular position.

22. Apparatus according to claim 11 including a pair of compression springs connected between said base and said shaft, said pair of springs being arranged to oppose each other when said shaft is in a reference translational position, and to apply forces to urge said shaft toward one of said limits of translation when said shaft is translated from said reference translation position.

23. Apparatus according to claim 11 including a pair of compression springs connected between said base and said shaft, said pair of springs being arranged to oppose each other when said shaft is in reference angular and translational positions, and to apply forces to urge said shaft toward said limits of translation and rotation when said shaft is moved from said reference positions.

24. Apparatus according to claim 11 in which said axis of said shaft is vertical, said apparatus having counterweight means acting along said axis of said shaft to oppose the weight of said ball support means and said ball.

25. Apparatus according to claim 17 in which said second and third positionable stops include means adjustable to limit translation of said shaft in third and fourth mutually-opposite directions.

26. Apparatus according to claim 25 in which said movable means includes means adjustable in accordance with a desired hole size to vary the amount of angular movement between said reference angular position and said second and third positionable stops and to vary the amount of translational movement between a reference translational position and said second and third positionable stops.

27. Bowling ball drilling apparatus, comprising in combination: a base; a drill carriage pivotally mounted on said base to pivot about a first axis, said drill carriage including drill feed means for advancing a drill tool along a second axis; ball support means mounted on said base for supporting a bowling ball in a reference position, said ball support means being rotatable about a third axis parallel to said first axis and passing through the center of said ball; and means for relatively displacing said drill tool and said ball support means in a direction parallel to said first axis; said first axis being located so as to be tangent to said bowling ball at a first point on the exterior surface of said bowling ball, said drill feed means being positionable adjustably with respect to said drill carriage to allow rotation of said drill feed means about a fourth axis, said fourth axis being tangent to said bowling ball and located to intersect said first axis at said first point and be perpendicular to said first, second and third axes.

28. Bowling ball drilling apparatus, comprising in combination: a base; a drill carriage pivotally mounted on said base to pivot about a first axis, said drill carriage including drill feed means for advancing a drill tool along a second axis; ball support means mounted on said base for supporting a bowling ball in a reference position, said ball support means being rotatable about a third axis parallel to said first axis and passing through the center of said ball; means for relatively displacing said drill tool and said ball support means in a direction parallel to said first axis; said first axis being located so as to be tangent to said bowling ball at a first point on the exterior surface of said bowling ball; first dial means adjustable in accordance with a desired span dimension; second dial means adjustable in accordance with a desired finger hole size, one of said dial means being connected to displace the other of said dial means to position an indicating mark in accordance with both said desired span dimension and said desired finger hole size; and means rotatable with said ball and ball support means about said third axis for alignment with said indicating mark to position said ball so as to determine the location of the finger hole in said ball.

29. Ball drilling apparatus, comprising in combination: a base; a tool carriage pivotally mounted on said base to pivot about a first axis; ball support means including a shaft for supporting a ball in a reference position, said shaft being slidably and rotatably mounted on said base with the axis of said shaft fixed parallel to said first axis; means for relatively displacing said tool carriage and said ball support means in a direction parallel to said axes; said first axis being fixedly located on said base so as to be tangent to the periphery of a standard size ball mounted in said ball support means.

30. Apparatus according to claim 29 in which said tool carriage has drill feed means for carrying a drill tool and for advancing said drill tool along a second axis, said first axis and the axis of said shaft defining a first plane; and means for adjustably positioning said drill feed means to adjust said second axis at a selected angle within a second plane perpendicular to said first plane.

31. Bowling ball drilling apparatus, comprising, in combination: a base; a drill carriage mounted on said base and including drill feed means for advancing a drill tool; ball-positioning means mounted on said base, said ball-positioning means including a shaft and ball support means mounted on said shaft, said shaft being rotatable about and translatable along the axis of said shaft; control means for rotating said shaft about its axis and for translating said ball support means along its axis; said drill carriage being pivotally mounted to be adjustable about a second axis fixed parallel to the axis of said shaft; and adjustable stop means for determining the limits of rotation and translation of said ball support means about and along the axis of said shaft.

32. Apparatus according to claim 31 in which said control means comprises a member connected to extend radially from said shaft; and adjustable cam means tapered radially and radially adjustable on said member; and in which said adjustable stop means comprises a plurality of adjustable stops located at a fixed radial distance from said axis of said shaft.

33. Apparatus according to claim 32 in which said adjustable stop means comprises a pair of stops which are adjustable in a direction parallel to the axis of said shaft.

34. Apparatus according to claim 32 in which said adjustable stop means comprises a pair of stops which are angularly adjustable about the axis of said shaft at a fixed radial distance from the center of said shaft.

No references cited.

WILLIAM W. DYER, JR., *Primary Examiner.*

FRANCIS S. HUSAR, *Examiner.*